(12) United States Patent
Berger

(10) Patent No.: US 6,308,586 B1
(45) Date of Patent: Oct. 30, 2001

(54) GEAR TRANSMISSION WITH STEPLESS ADJUSTABLE TRANSLATION

(76) Inventor: Matthias Berger, Weimar (DE)

(*) Notice: Subject to any disclaimer, the term of this patent is extended or adjusted under 35 U.S.C. 154(b) by 0 days.

(21) Appl. No.: 09/542,700

(22) Filed: Apr. 3, 2000

Related U.S. Application Data (63) Continuation-in-part of application No. PCT/DE00/00439, filed on Feb. 14, 2000, which is a continuation-in-part of application No. PCT/DE98/02899, filed on Sep. 28, 1998.

(30) Foreign Application Priority Data

Oct. 1, 1997 (DE) .............................................. 197 43 483
Feb. 19, 1999 (DE) .............................................. 199 07 775

(51) Int. Cl.[7] ................................................. F16H 29/08
(52) U.S. Cl. ........................... 74/63; 74/53; 74/119; 74/125; 74/127; 74/569; 74/834
(58) Field of Search .................................. 74/53, 63, 66, 74/69, 117, 119, 122, 123, 124, 127, 569, 833, 834, 125

(56) References Cited

U.S. PATENT DOCUMENTS 2,254,195 * 8/1941 Cicin ........................................ 74/119
3,327,544 * 6/1967 Colinet .................................... 74/125
4,565,105    1/1986 Peterson .

FOREIGN PATENT DOCUMENTS

| 378415 | 7/1923 | (DE) . |
| 474205 | 3/1929 | (DE) . |
| 718316 | 3/1942 | (DE) . |
| 2130671 | 6/1984 | (GB) . |
| 2137724 | 10/1984 | (GB) . |

* cited by examiner

Primary Examiner—Allan D. Herrmann
(74) Attorney, Agent, or Firm—Horst M. Kasper (57) ABSTRACT

The invention relates to a gear transmission with a steplessly adjustable translation ratio for converting of rotary speeds and of torques of shafts. The uniform rotary motion of a drive shaft is transferred to a driven shaft with the aid of time staggered operating gear transmission units. The rotary motion is transformed by a cam transmission initially into a uniform translational motion and in the following this uniform translational motion is transformed into another, also uniform translational motion, with a speed depending on the translation ratio setting with a translation device. Finally this translational motion is transferred again into a uniform rotary motion by a further planar cam transmission and transferred to the driven shaft.

22 Claims, 6 Drawing Sheets

GEAR TRANSMISSION WITH STEPLESS ADJUSTABLE TRANSLATION

CROSS-REFERENCE TO RELATED APPLICATIONS

This application is a continuation-in-part application of the following international applications filed under the Patent Cooperation Treaty, application Ser. No. PCT/DE98/02899, filed on Sep. 28, 1998, and application Ser. No. PCT/DE00/00439, filed on Feb. 14, 2000, listing the United States as a designated and/or elected country. The entire disclosure of these aforementioned applications, including the drawings thereof, is hereby incorporated in this application as if fully set forth herein.

BACKGROUND OF THE INVENTION

1. Field of the Invention

The invention relates to a gear transmission with stepless adjustable translation ratio for converting rotational speeds and torques between two shafts.

2. Brief Description of the Background of the Invention including Prior Art

Such converters are employed in the complete drive technology, in particular with machine tools and drives for vehicles.

Motors depend in their mechanical power on the rotation speed. Motors operate usually in their most economic region of rotation speed under favorable energy use or in the region of maximum delivered power. In contrast the driven machines are to exhibit different rotation speeds depending on their use or, respectively, their operating state in each case. The rotation speeds of drive unit and driven machine are adapted to each other by gear change boxes with corresponding transmission ratios. The loss in motor power can be kept small upon optimum setting of the transmission ratio. An optimum transfer of the rotary motion is possible under small power loss with gear transmissions having steplessly adjustable transmission ratios with a corresponding degree of effectiveness of the arrangement.

Mechanical, electrical and hydraulic converters are distinguished with such stepless rotation speed converters corresponding to their operating principle.

Mechanical systems for rotation speed conversion have become known as friction gear transmissions or traction mechanism transmissions. The motion (torque, rotation speed) is transferred in friction gear transmissions by frictional engagement at rotation symmetrical bodies with a steplessly changeable effective diameter or, respectively, effective circumference. The required friction between the friction wheels can only be achieved by large press-on forces. The large press-on forces require however high loads of material at the two contract points or, respectively, contact lines and represent a substantial load for the bearings and the drive shafts. In addition, friction wheel gear transmissions are associated with a substantial slippage, which slippage again results in a decreased degree of effectiveness of the arrangement.

Traction mechanism transmissions work as chain transmissions or belt transmissions with the drive members and driven members of a pair of cone disks, wherein the chain disks are endlessly surrounded by a chain or, respectively, by a belt. They work according to the principle of the stepless adjustment of the operating diameter of the cone disks, wherein at least one of the cone disks is axially adjustable. Belt drives however are only employed for smaller powers, chain drives are preferably employed with stationary machines.

The hydrostatic variable speed gears from a combination of a vane pump and vane motor are standing among the hydraulic transmissions with steplessly changeable rotation speed, wherein a pump transports a liquid into the motor and wherein the rotation speed of the vane motor (driven part) depends on the transport volume or, respectively, the gulp volume of the motor. The liquid flow is used for force transmission in hydrodynamic rotation speed converters with a pump and a turbine wheel. The hydraulic transmissions are to a large extent associated with slippage and require high expenditures.

Similarly electrical stepless transmissions are only suitable for special application purposes because of the not inconsiderable plant expenditures and therefore are not to be considered further in this context.

Gear transmission with overrunning clutches also belong to the mechanical stepless rotation speed converters and are frequently designated as ratchet gear mechanism, which transforms a uniform rotary motion of a drive shaft into periodical oscillations or non-uniform rotary motions. The periodical oscillations or non-uniform rotary motions are transformed into a uniformly directed rotary motion of the driven shaft in the region of the velocity peak by way of a free wheel clutch. Coupled gears or also curved gears in multiple presence, which are operating phase shifted relative to each other, are employed on the drive shaft in order to decrease the nonuniformity of the rotary motion and in order to achieve nearly constant translation ratios. A value more or less densely varying around a middle value is obtained for the angular speed of the driven shaft, wherein the variations become smaller the larger the number of the individual gears disposed next to each other and operating with phase shift.

The still present nonuniformity of the rotary motion can cause substantial load peaks and thereby causes a high wear and a low lifetime of the transmission gear. The ratchet gear transmissions, which have become known therefore are constructed only for small mechanical powers.

Transmission gears with intermittently operating and driving members have been proposed, wherein these gears strive for a principle uniformity of the transmission ratio. The results of these solutions however are either not satisfactory, not sufficient wear resistant or they require a high constructive expenditure.

A variation of a ratchet gear mechanism is proposed in the German patent 474,205, wherein the rotary motion of the drive shaft is transformed by way of several curve disks disposed on the driving shaft into a back and forth motion of push rods and into a back and forth motion of gear racks by intermediate positioning of a variable translation device, wherein the gear racks in the following successively operate on the driven shaft through gear wheels and limited slip couplings (free engine clutches, overriding clutches) and drive the driven shaft. The variable transmission device comprises a two armed lever with adjustable hinge point for changing of the in each case effective lever lengths and therewith also changing the size of the transmission ratio. The gear racks move with an uniform speed during the force transmission phase and thus can drive the driven shaft with a uniform angular speed.

The motion transfer from the drive shaft in the driven shaft is performed in the transmission gear system according to U.S. Pat. No. 4,565,105 through cam disks circulating with the driving shaft and sampling members or scanning members, which transform the rotary motion in each case into a translation motion, wherein the translation motion also is transferred in each case to a gear rack/gear wheel part transmission through in each case a rotatably supported lever with adjustable rotation axis and is converted into a rotary motion of the driven shaft by intermediate positioning of in each case a free wheel clutch.

A substantial deficiency of these transmission gear systems comprises that the wear appearances occur with the transformation of the translational motion of the gear rack into the rotary motion of the gear wheel, wherein the wear appearances are caused in particular by the sliding friction effects, are of substantial size especially in continuous operation and thus can substantially interfere with the reliability of the overall gear transmission. The wear appearances concerning in particular those regions of the gearing of gear rack and gear wheel, which regions of gearing are subjected more frequently to a particularly high mechanical load in continuous operation as compared to other regions during periodical loads. The non-uniform distribution of the material abrasion by wear, based on the nonuniform loading of the available stroke distance of the toothed rack, is further increased, so that in the case of a decreased stroke (decrease of the length of the stroke distance) based on an enlargement of the translation ratio setting, the force to be transferred still increases under the precondition of a constant transfer power.

The strong and in particular nonuniform wear at the function determining contact faces of the gearing entails deviations from the desired relative motion of the drive means, which in turn are the cause for a rapidly progressing wear process.

In addition there is generated a nonuniformity in the running of the gear transmission with the frequency of the gearing teeth engagement, because flank regions of each tooth wear off nonuniformity, wherein the wear processes are most pronounced at the foot of the tooth.

The recited disadvantages decrease the reliability and the operational life of such gear transmission systems substantially.

SUMMARY OF THE INVENTION

1. Purposes of the Invention

Therefore it is an object of the invention to furnish a mechanical gear transmission with continuously changeable transmission ratio with an as uniform as possible transmission of the rotary motion of the drive shaft to the driven shaft and with as low as possible wear appearances at the function determining contact faces, in particular of the driven side gear transmission part system. The reliability of the overall system is to be improved thereby and the maximum operational life of the overall system is to be increased. In addition the mechanical drive working with a stepwise driving member should be suitable for a stepless rotation speed or, respectively, torque conversion for application within a large region of mechanical power to be transferred. The overall system in addition should be free of slippage and should operate with a high degree of effectiveness.

These and other objects and advantages of the present invention will become evident from the description which follows.

2. Brief Description of the Invention

The present invention discloses a gear transmission arrangement with steplessly adjustable translation ratio.

The gear transmission according to the present invention includes at least two gear transmission units, which two gear transmission units transform the uniform rotary motion of a drive shaft to such rotary oscillations under the precondition of a just constantly maintained translation ratio setting, wherein the rotary oscillations contain in each case a section of uniform rotary motion with a steplessly preselectable angular speed. These gear transmission units are tuned to each other such that at each point in time at least one gear transmission unit is disposed in the section of constant rotary speed and thus also at least one gear transmission unit can uniformly drive the driven shaft through a switchable or an automatically switchable coupling (for example, a free wheel clutch). Each gear transmission unit transforms the uniform rotary motion of the drive shaft into an about periodical motion with a first force transmission means for the generation of such a rotary oscillation, wherein the about periodical motion is uniform and straight line for a certain time period. This motion is then transformed into another about periodical motion by a translation device steplessly adjustable with a translation setting device, wherein the other about periodical motion represents a translational motion with a (another) constant speed depending on the translation ratio setting for at least a part of the recited time period. This motion is now transformed into the already described rotary oscillation by a second force transmission means.

The material load of the gear transmission elements based on friction is substantially less in the gear transmission construction according to the present invention, wherein a cam gear performs the transformation of the translated uniform translation motion into the uniform rotary motion of the driven shaft, because the friction occurs here in particular as a roller friction, wherein the roller friction is by orders of magnitude smaller as compared with the sliding friction by motion transfer through gear rack/gear wheel in the above recited gear transmission systems. The material abrasion or, respectively, the wear, is reduced and the mode of operation of the overall gear transmission with respect to uniformity of its courses of motion is improved and the useful life of the overall gear transmission is increased.

A gear transmission with a steplessly adjustable translation comprises a drive shaft, a driven shaft, at least a first gear transmission unit, and a second gear transmission unit, and switching couplings.

The first gear transmission unit includes a first force transmission means wherein the first force transmission means transforms a first uniform rotary motion of the drive shaft into a first uniform translation motion during a first force transmission phase, a first changeable translation device, wherein the first changeable translation device converts the first uniform translation motion into a second uniform translation motion with a speed depending on a chosen value of a translation setting during the first force transmission phase while the translation setting is maintained at a the chosen value, and a second force transmission means including a second cam transmission and wherein the second force transmission means transforms the second uniform translation motion into a second rotary motion during the first force transmission phase while the translation setting is maintained constant at the chosen value.

The second gear transmission unit includes a third force transmission means wherein the third force transmission means transforms the first uniform rotary motion of the drive shaft into a third uniform translation motion during a second force transmission phase, a second changeable translation device, wherein the second changeable translation device converts the third uniform translation motion into a fourth uniform translation motion with a speed depending on the chosen value of the translation setting during the second force transmission phase while the translation setting is maintained at the chosen value, and a fourth force transmission means including a fourth cam transmission and wherein the fourth force transmission means transforms the forth uniform translation motion into a third uniform rotary motion while the translation setting is maintained at the chosen value during the second force transmission phase.

The switching couplings transfer the second uniform rotary motion and the third uniform rotary motion to the driven shaft. The rotary motion of the drive shaft is sequentially and intermittently transferred to the driven shaft by the first gear transmission unit and, respectively, by the second gear transmission unit for in each case a respective time interval designated as a respective force transmission phase.

The second cam drive, which is contained in the second force transmission means, comprises a second cam member, which drives the driven shaft through the first switching coupling and a second straight line guided engagement member. In the case of a planar cam drive is the second cam member a planar cam member with a second curve flank, which can be formed as a involute of a circle in the load region.

The fourth cam drive, which is contained in the fourth force transmission means, comprises a fourth cam member, which drives the driven shaft through the second switching coupling and a fourth strait line guided engagement member. In case of a planar cam drive is the fourth cam member a planar cam member with a fourth curve flank, which can be formed as a involute of a circle in the load region.

The invention is to be explained in more detail by way of several embodiments and the associated drawings. It is always presupposed that the translation ratio setting is maintained just constant over the time periods here considered and that the drive shaft rotates uniformly.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawing, in which are shown several of the various possible embodiments of the present invention:

FIG. 2b is a schematic diagram of a top planar view of the embodiment of FIG. 2a, and FIG. 3 is a schematic diagram of a side elevational view of the gear transmission unit according to figure 1a, 1b with a means for mass balancing and for balancing of bearing forces, wherein the inner flank of the groove curves of drive disk and of driven disk are illustrated.

DESCRIPTION OF INVENTION AND PREFERRED EMBODIMENT

Figure 1A:
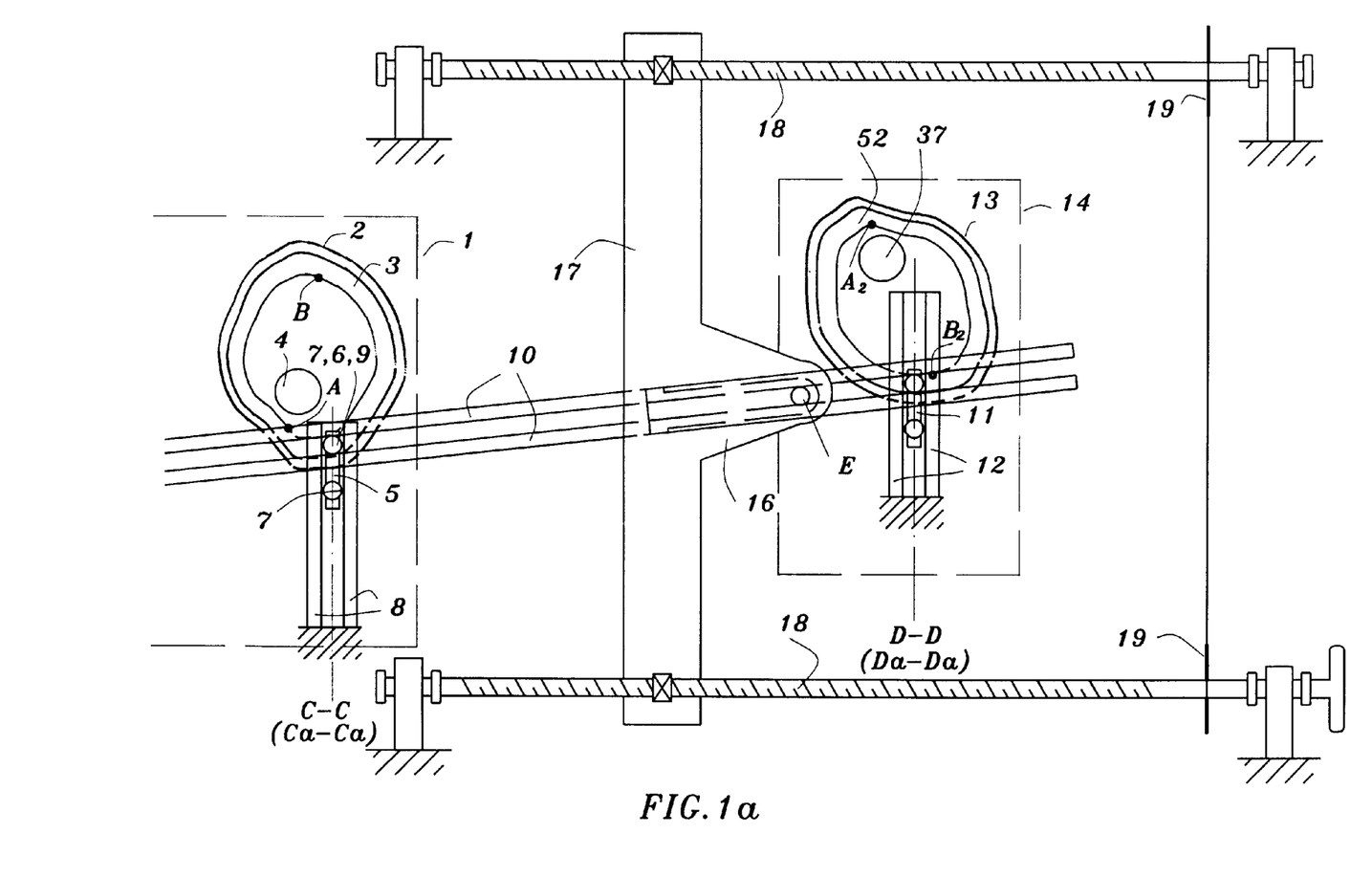
FIG. 1a is a schematic diagram of a side elevational view of a gear transmission unit of a gear transmission according to the present invention.
Figure 1B:
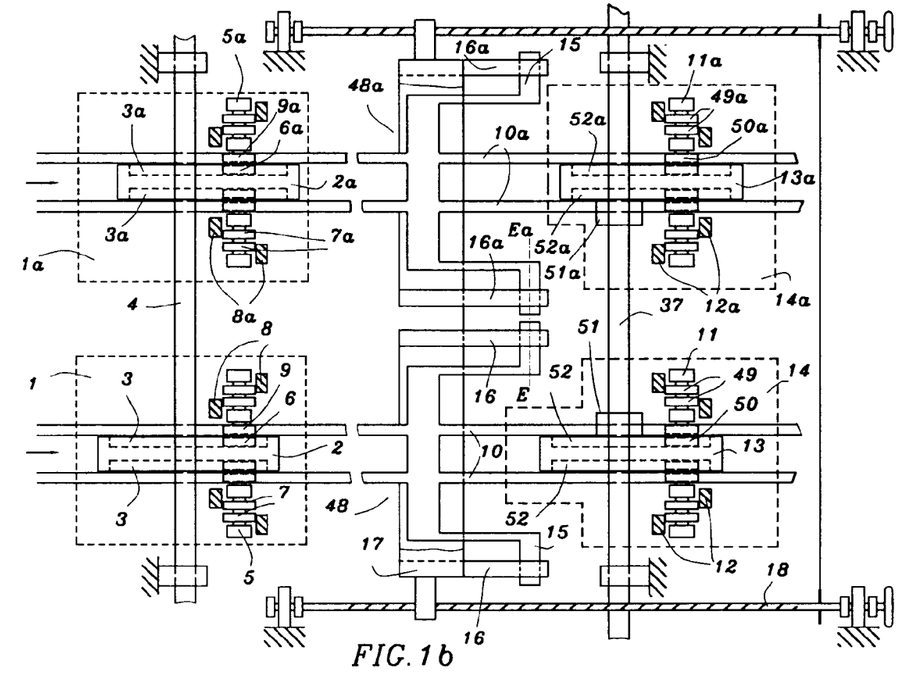
FIG. 1b is a schematic diagram of a top planar view of the gear transmission according to FIG. 1a, FIG. 2a is a schematic diagram of a side elevational view of the gear transmission according to the present invention with removed cam disks 20b, 21b, and 22b, wherein a cam member of a first force transmission means drives two gear transmission units on the drive side.

The gear transmission according to the present invention is schematically illustrated in the FIGS. 1a and 1b, wherein two gear transmission I, II units of the gear transmission are disposed axially next to each other. However, FIG. 1a shows only one of the two, equally constructed gear transmission units for purposes of surveyability. A planar cam gear transmission with a cam disk as a cam member 2 is employed as a first force transmission means 1, wherein the cam disk is furnished on two sides with a groove curve 3. The cam member is connected to the drive shaft 4 fixed against rotation. The curve flank of the groove curve exhibits the form of an involute of a circle in the load region, which load region is the region between the position A and position B in the figure while the disk is rotating in the right direction. The region of the curve flank to be understood as the load region, which region of the curve flank serves for the force transmission during constant translation ratio setting. A lift slider with curve rollers 6 serves as an engagement member 5. The engagement member is led along the guide rails 8 in a guide track C—C along a straight line with the rollers 7. The motion of the lift slider is transferred to a lever system of a changeable translation device 48 with lever rails 10 with the aid of lever rail rollers 9, wherein the lever rail rollers 9 are supported on the same axis as the cam rollers 6 according to the embodiment. The rotatably supported lever system moves a lift slider, wherein the lift slider serves as an engagement member 11 for a second force transmission means 14. The lift slider 11 is of the same construction as the engagement member 5 and is guided by guide rails 12 with rollers 49 (FIG. 1b) in a guide track D—D, wherein the guide track D—D is running parallel to the guide track C—C and parallel to the guide rails 8. The lift slider drives with its cam roller 50 the cam member 13 of the force transmission means 14, wherein the cam member 13 with its groove curve 52 is constructed analogously to the cam member 2 and performs rotary oscillations. The sections of uniform rotary motion of these rotary oscillations are in each case transferred to a driven shaft 37 by an automatically switching or switching coupling 51 during the force transmission phase. The rotary support of the lever system is performed by bearing supports 16 with axle stubs 15 disposed staggered by crimping. The bearing supports are attached at a frame 17, wherein the frame 17 can be shifted relative to the casing by employing of threaded spindles 18 and the frame 17 can be fixed in any preselected position. The rotation of the threaded spindles is performed always in the same sense of rotation and by in each case the same amounts, for example, by employing a chain gear transmission 19.

The engagement member 5 performs an oscillating straight line motion under the precondition of a uniform rotary motion of the drive shaft 4, wherein the oscillating straight line motion represents a uniform motion independent of the translation ratio setting during the force transmission phase. In contrast the engagement member 11 performs an oscillating straight line motion, which oscillating straight line motion is uniform during the force transmission phase and wherein the (constant) speed of the uniform straight line motion depends on the respective translation ratio setting. The translation ratio setting is determined by the ratio of the effective lever lengths of the lever system. The ratio of the effective lever lengths in turn is defined by the ratio of the distances between the hinge point E of the lever system and the guide tracks C—C, D—D of the engagement members. These distances are fixed by the position of the frame 17 with the aid of the threaded spindles 18, because the frame 17 supports the bearing supports 16 for a rotatable support of the lever system. Thus the translation ratio can be steplessly adjusted by rotating the threaded spindles and can assume any desired, predetermined value within certain limits. The staggered arrangement of the axle stubs 15 allows to shift the hinge point E of the lever system up to the guide track D—D and beyond the guide track D—D. The driven rotation speed can thereby be lowered to the value zero by shifting of the hinge point E and also a reversal of the rotation direction of the driven shaft 37 (with unchanged driving direction) can be performed with suitable couplings.

The engagement member of the first or second force transmission means does not have to be the stroke element at the same time as described above, wherein the stroke element engages into the lever rails 10 of the lever system. Engagement member and stroke element can also be different constructive parts, wherein a force transfer is performed between the engagement member and the stroke element.

The coupling 51 can be switched according to the rotary position of the drive shaft when employing a switchable coupling between the cam member 13 of the force transmission means 14 and the driven shaft 37. Also devices can be furnished in case of an employment of automatic switching couplings (for example of free wheel clutches), wherein the devices engage such in the coupling, depending on the rotary position of the drive shaft, that the friction of the coupling is reduced in the idling phase and that the coupling play is reduced in the switching phase.

The second gear transmission unit 11 includes a third force transmission means 1a, a second changeable translation device 48a, a fourth force transmission means 14a and a second switching coupling 51a. A third planar cam gear transmission with the third planar cam member 2a is employed in the third force transmission means 1a. The cam member is furnished on two sides with a groove curve 3a, which is formed in the load region as an involute of a circle. The cam member 2a is connected to the drive shaft 4 fixed against rotation. A lift slider with curve rollers 6a serves as a engagement member 5a. The engagement member is led along guide rails 8a in a guide track $C_a$—$C_a$ along a straight line with rollers 7a. The motion of the lift slider is transferred to a second lever system of a changeable translation device 48a with second lever rails 10a with the aid of lever rail rollers 9a. The lever rail rollers are supported on the same axis as the curve rollers 6a in the embodiment. The second rotatably supported lever system with the lever rails 10a moves a fourth engagement member (stroke element) 11a of the fourth force transmission means 14a. The stroke element is of the same construction as the engagement member (stroke element) 5a and is guided by guide rails 12a with rollers 49 a in a second guide track $D_a$—$D_a$, wherein the guide track $D_a$—$D_a$ is running parallel to the guide track $C_a$—$C_a$ and parallel to the guide rails 8a. The lift slider (stroke element) 11a drives with its cam roller 50a the cam member 13a of the fourth force transmission means 14a, wherein the cam member 13a with its groove curve 52a is constructed analogously to the cam member 2a and performs rotary oscillations. The sections of uniform rotary motion of these rotary oscillations are in each case transferred to the driven shaft 37 by an automatically switching or switching coupling 51a during the second force transmission phase. The rotary support of the second lever system with lever rails 10a is performed by bearing supports 16a with axle stubs 15 disposed staggered by crimping. The bearing supports are attached at the frame 17, wherein the frame can be fixed in any preselected position in known manner. The engagement member 5a performs an oscillating straight line motion under the precondition of a uniform rotation motion of the drive shaft 4, wherein the oscillating straight line motion represents a uniform motion independent of the translation ratio setting during the second force transmission phase. In contrast the engagement member 11a performs an oscillating straight line motion during the second force transmission phase, which oscillating straight line motion is uniform during the force transmission phased wherein the (constant) speed of the uniform straight line motion depends on the respective translation ratio setting. Consequently the rotary motion of the drive shaft 4 is sequentially and intermittently transferred to the driven shaft 37 by the first gear transmission unit I during the first force transmission phase and, respectively, by the second gear transmission unit II during the second force transmission phase.

Figure 2A:
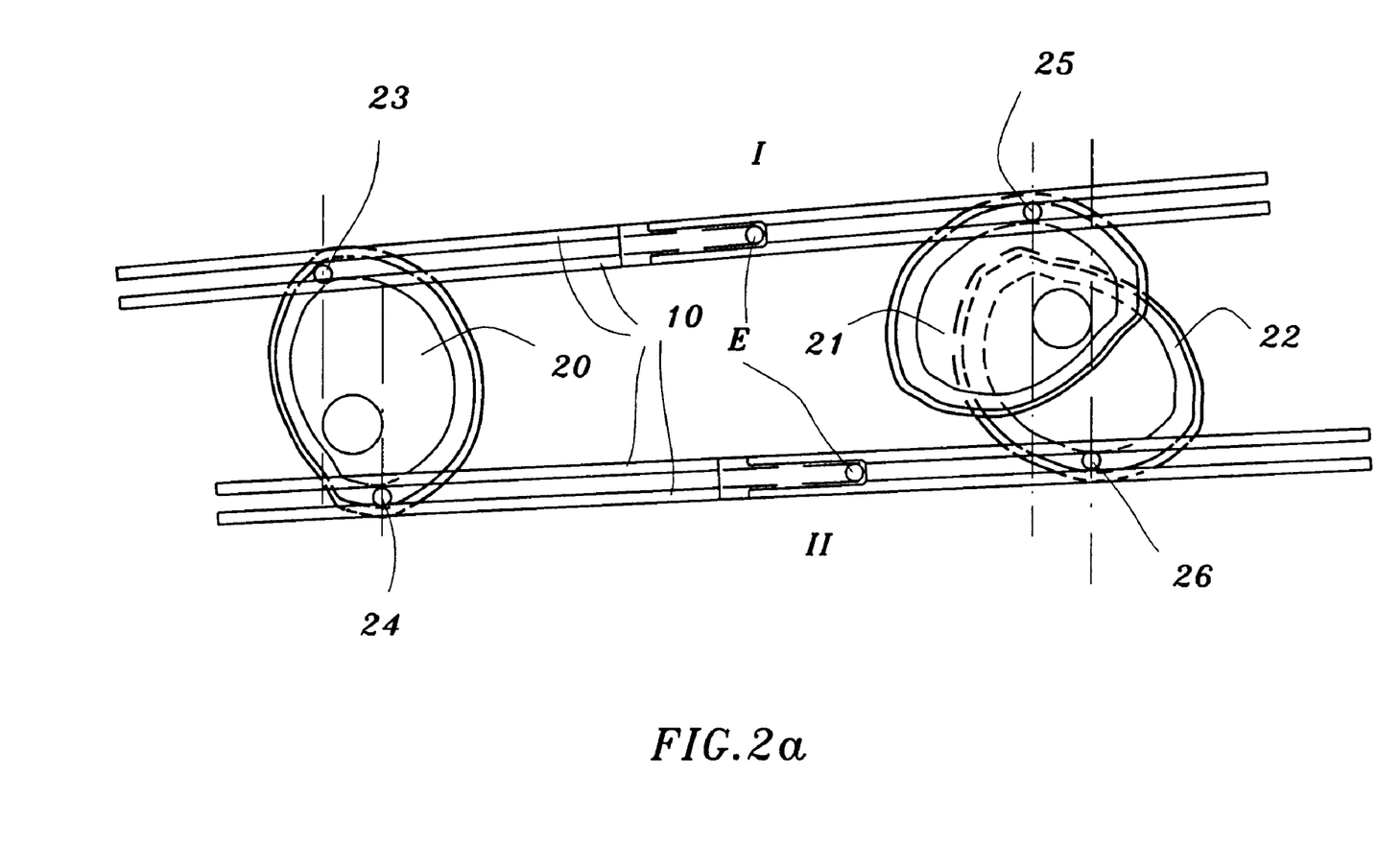
Figure 2B:
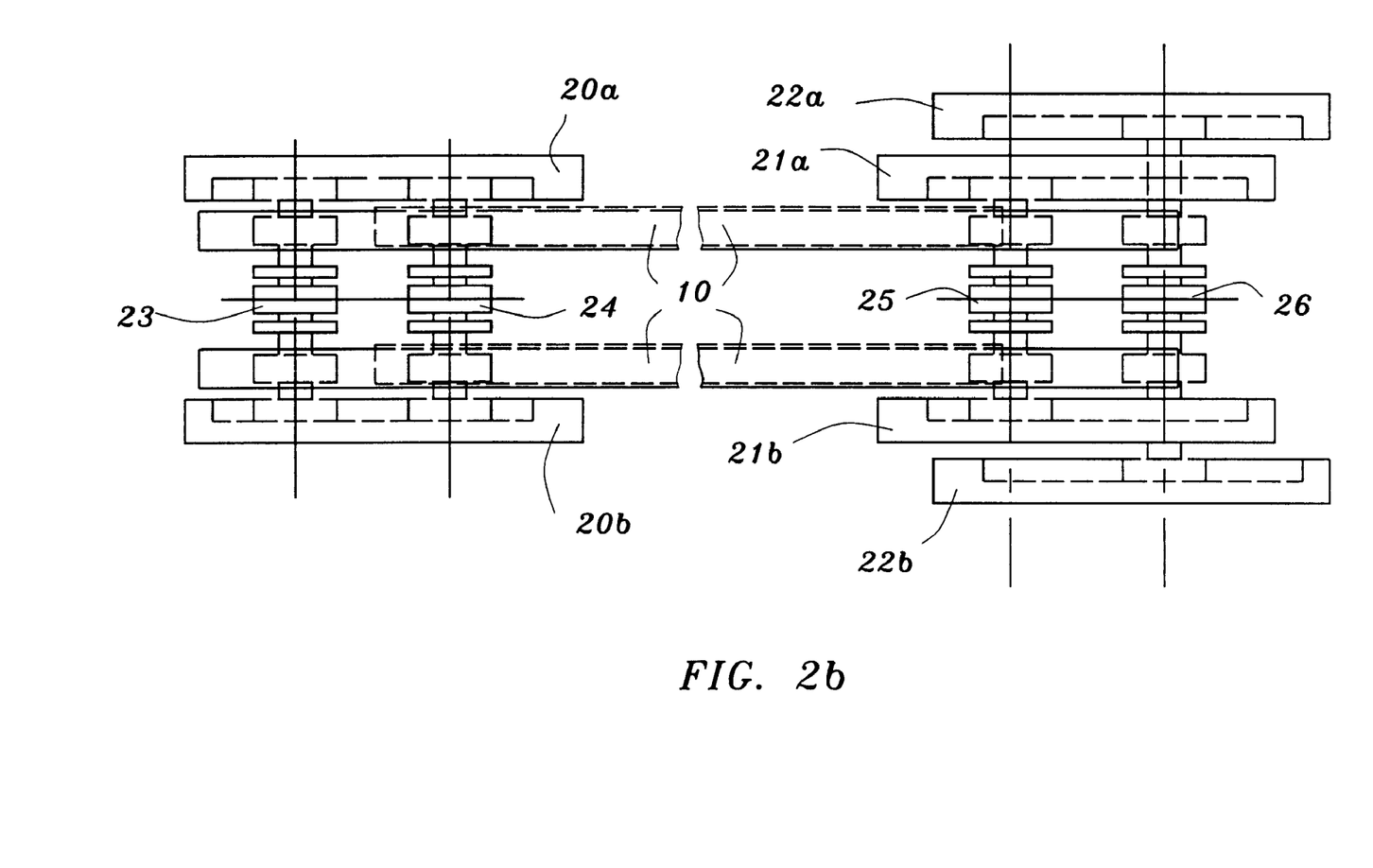

A gear transmission with its two gear transmission units I and II is employed in the embodiment according to FIGS. 2a and 2b, wherein however the two gear transmission units I and II are not disposed axially next to each other. This arrangement is possible, because now the cam member 20 of the first force transmission means drives the two gear transmission units. The cam member 20 comprises two synchronously rotating cam disks 20a and 20b, which cam disks 20a and 20b are connected to the drive shaft fixed against rotation. The cam member 21 of the second force transmission means of the gear transmission unit I and the cam member 22 of the second force transmission means of the gear transmission unit II comprise also in each case cam disks 21a and 21b or, respectively, 22a and 22b synchronously rotating and constructed like the cam disks 20a and 20b.

Based on the subdivided construction of the cam members, the engagement members 23, 24, 25 and 26, which simultaneously serve as stroke elements for the translation device, will not have any longer to be constructed as a lift slider or slider, as in the example according to FIG. 1, but the engagement members can be formed as simple axles with several rollers supported rotatably on the axles. The straight line uniform motion according to the basic functional principle of the gear transmission arrangement is performed only by the middle axles of the engagement members thereby.

Figure 3:
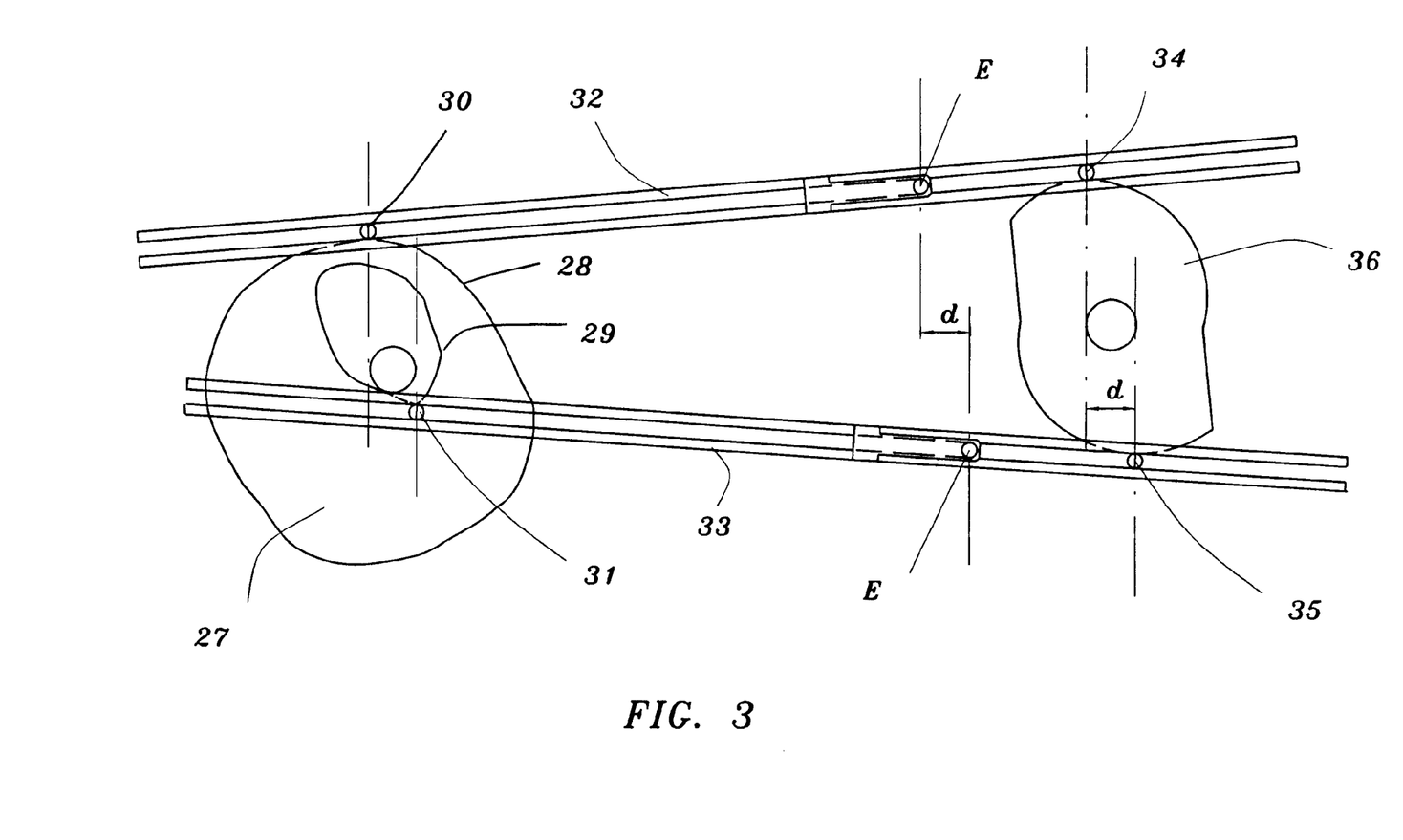

Two axially next to each other disposed gear transmission units are employed in the embodiment according to FIG. 3, wherein however only one of the gear transmission units is illustrated here. The drive side disposed cam member 27 exhibits two groove curves 28 and 29 for preventing interfering influences on the frame based on the forces of inertia of the masses, wherein the curve flanks of the two groove curves 28 and 29 are constructed such that the engagement members 30 and 31 perform a translational motion with the same amount of velocity but in opposite direction at each point in time.

The curve flanks have the shape of an involute of a circle belonging to the same generating circle in the load region. Each of the two engagement members 30 or 31, respectively, drives a lever system 32, or respectively, 33, which lever system 32 or, respectively, 33 operates on the driven side onto an engagement member 34 or, respectively, 35. The engagement members 34, 35 are disposed centered symmetrically relative to the rotation axis of a cam member 36, wherein two useful flanks of the cam member 36 have the shape of two involutes of a circle also disposed centered symmetrically. The engagement members 34 and 35 both transfer the force onto the cam member 36, wherein the cam member 36 again is intermittently coupled to the driven shaft. The engagement members 30 and 31 as well as 34 and 35 are disposed continuously in the same, however oppositely directed, motion state as are the two lever systems 32 and 33. The forces of inertia of the masses of the engagement members 30 and 31 as well as 34 and 35 are therefore substantially compensated and thereby can hardly become negatively effective toward the outside through the casing.

In addition the forces, which the engagement members transfer to the cam members, are transformed essentially into torques operating on the drive shaft and the driven shaft and thus the bearings of the cam members are relieved by the pairwise arrangement.

Figure 4:
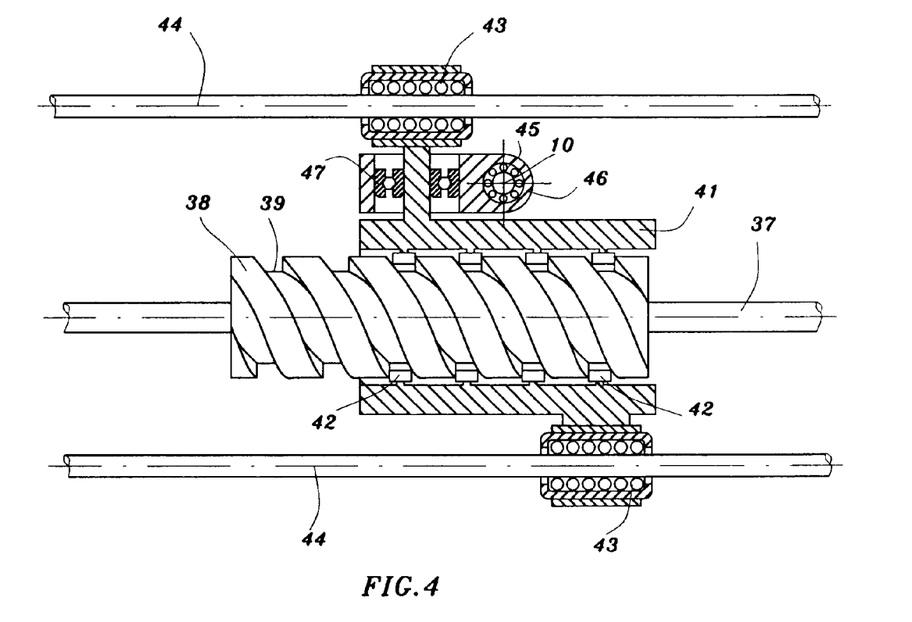
FIG. 4 is a side elevational and in part sectional view of a spacial cam transmission as a second force transmission means.

The embodiment examples considered up to now employ only planar cam drives as force transmission means. By way of example, FIG. 4 illustrates a spacial cam transmission, which can be employed in connection with the second force transmission means. A bush 41 of a push member 40, wherein the push member 40 serves as an engagement member of the cam transmission, a linear ball bearings 43, and a hinge support 46 are illustrated here in section, wherein the section plane passes through the middle axes of a drive shaft 37 and of guide rails 44. The spacial cam drive exhibits a cylinder-shaped cam member 38 in an embodiment example, wherein the cylinder-shaped cam member 38 is furnished with two open groove curves 39 like a (two-step) threading, wherein the two open groove curves 39 describe several circulations. The push member 40 with its bush 41 concentrically surrounding the cam member 38 as well as cam rollers 42 rotatably attached at this bush 41 is guided by the linear ball bearing 43. The cam rollers 42 can move in straight line direction along the guide rails 44 fixed to the frame. The lever system is furnished here with a round lever rail 10. The motion of the lever rail is transferred to the hinge support 46 through a guide 45. A linear ball bearing serves as a guide 45, wherein the linear ball bearing can only move along the lever rail 10. The hinge support is rotatably attached to the push member 40 through a hinge member 47, wherein the hinge member 47 is formed by a ball bearing. The hinge member 47 allows the hinge support to adapt continuously to the changeable alignment of the lever rail. The lever rail 10 can thereby shift the push member 40. The force transferred by the back and forth moving push member is transferred to the cam member 38 and imposes an oscillating rotary motion to the cam member 38. The oscillating rotary motion is finally transformed into a rotation of the driven shaft 37 by a coupling not illustrated here.

Based on the constant slope of the groove curves 39 it is possible that each one of the groove curves is engaged simultaneously with several cam rollers 42. The force transferred is thereby subdivided onto several cam rollers.

The embodiment examples described here represent only preferred embodiments of the invention. It is decisive for other constructive solutions that a uniform rotary motion of the drive shaft is translated into a uniform rotation of the driven shaft with a motion transformation by the second force transmission means by using planar or spacial cam transmissions. The function of the overall system is improved and the useful lifetime of the overall system is increased by a decisive measure by the obtained minimization of the frictional forces and the therewith associated far reaching inhibition of non-uniform material abrasion at the contact faces of the second force transmission systems important for the functioning of the system.

It will be understood that each of the elements described above, or two or more together, may also find a useful application in other types of transmission system configurations and mechanical energy processing procedures differing from the types described above.

While the invention has been illustrated and described as embodied in the context of a gear transmission with stepless adjustable translation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A transmission gear with the steplessly adjustable translation comprising
  a drive shaft (4);
  a driven shaft (37);
  a first gear transmission unit (I) including
    a first force transmission means connected to the drive shaft wherein the first force transmission means transforms a first uniform rotary motion of the drive shaft into a first uniform translation motion during a first force transmission phase;
    a first changeable translation device (48) connected to the first force transmission means, wherein the first changeable translation device converts the first uniform translation motion into a second uniform translation motion with a speed depending on a chosen value of a translation setting during the first force transmission phase while the translation setting is maintained at the chosen value;
    a second force transmission means (14) connected to the first changeable translation device (48) and including a first cam transmission (11, 12, 13, 49, 50) and wherein the second force transmission means transforms the second uniform translation motion into a second uniform rotary motion during the first force transmission phase while the translation setting is maintained at the chosen value;
    a first switchable or automatically switching coupling (51) connected to the second force transmission means (14) and to the driven shaft (37), wherein the first switching coupling transfers the second uniform rotary motion to the driven shaft during the first force transmission phase while the translation setting is maintained at the chosen value;
  a second gear transmission unit (II) including
    a third force transmission means (1a) connected to the drive shaft (4) wherein the third force transmission means transforms the first uniform rotary motion of the drive shaft into a third uniform translation motion during a second force transmission phase;
    a second changeable translation device (48a) connected to the third force transmission means (1a), wherein the second changeable translation device converts the third uniform translation motion into a fourth uniform translation motion with a speed depending on the chosen value of the translation setting during the second force transmission phase while the translation setting is maintained at the chosen value;
    a fourth force transmission means (14a) connected to the second changeable translation device (48a) and including a second cam transmission (11a, 12a, 13a, 49a, 50a) and wherein the fourth force transmission means transforms the fourth uniform translation motion into a third uniform rotary motion during the second force transmission phase while the translation setting is maintained at the chosen value;

a second switchable or automatically switching coupling (51a) connected to the fourth force transmission means (14a) and to the driven shaft (37), wherein the second switching coupling transfers the third uniform rotary motion to the driven shaft during the second force transmission phase while the translation setting is maintained at the chosen value;

wherein the rotary motion of the drive shaft (4) is sequentially and intermittently transferred to the driven shaft (37) by the first gear transmission unit (I) during the first force transmission phase and, respectively, by the second gear transmission unit (II) during the second force transmission phase.

2. The gear transmission with a steplessly adjustable translation ratio according to claim 1, wherein the cam transmission (11, 12, 13, 49, 50), which is contained in the second force transmission means (14), is a planar cam transmission and comprises a planar cam member (13), which drives the driven shaft (37) through the switching coupling (51) and wherein curve flanks (52) of the planar cam member (13) are formed as an involute A2B2 of a circle in the load region, and wherein the planar cam transmission is furnished with a straight line guided engagement member (11).

3. The gear transmission with a steplessly adjustable translation ratio according to claim 1, wherein the cam transmission (11a, 12a, 13a, 49a, 50a), which is contained in the fourth force transmission means (14a) is a planar cam transmission and comprises a planar cam member (13a), which drives the driven shaft through the switching coupling (51a) and wherein curve flanks (52a) of the planar cam member are formed as an involute of a circle in the load region, and a straight line guided engagement member (11a).

4. The gear transmission with a steplessly adjustable translation ratio according to claim 1, wherein the first force transmission means (1) includes a planar cam gear transmission (2, 5, 6, 7, 8), wherein the planar cam gear transmission includes a planar cam member (2), wherein the planar cam member is driven by the drive shaft (4) and wherein curve flanks (3) of the planar cam member are formed in the load region as an involute of a circle, and wherein the first planar cam gear transmission includes a straight line guided engagement member (5).

5. The gear transmission with a steplessly adjustable translation ratio according to claim 4, wherein the third force transmission means (1a) includes a planar cam gear transmission (2a, 5a, 6a, 7a, 8a), wherein the planar cam gear transmission includes a planar cam member (2a), wherein the planar cam member is driven by the drive shaft (4) and wherein curve flanks of the planar cam member are formed in the load region as an involute of a circle, and wherein the planar cam transmission is furnished with a straight line guided engagement member (5a).

6. The gear transmission with a steplessly adjustable translation ratio according to claim 1, wherein the first changeable translation device (48) comprises a first rotatably supported lever system with first lever rails (10), wherein a first stroke element (5) of the first force transmission means (1) and a second stroke element (11) of the second force transmission means (14) engage the lever rails, wherein the first stroke element and the second stroke element are guided in first straight line motion tracks (C—C, D—D) disposed parallel to each other and wherein the position of the first hinge point (E) of the first lever system with first lever rails (10) is such adjustable, that the ratio of the distances between the first hinge point and the first motion tracks can be steplessly changed.

7. The gear transmission with a steplessly adjustable translation ratio according to claim 1, wherein the second changeable translation device (48a) comprises a second rotatably supported lever system with second lever rails (10a), wherein a third stroke element (5a) of the third force transmission means (1a) and a fourth stroke element (11a) of the fourth force transmission means (14a) engage the second lever rails, wherein the third stroke element and the fourth stroke element are guided in second straight line motion tracks (Ca—Ca, Da—Da) disposed parallel to each other and wherein the position of the second hinge point (Ea) of the second lever system with second lever rails (10) is such adjustable, that the ratio of the distances between the second hinge point and the second motion tracks can be steplessly changed.

8. The gear transmission with a steplessly adjustable translation ratio according to claim 6, wherein the first lever system with first lever rails (10) is rotatably supported in first bearing supports (16) guided through a frame (17), wherein the frame is parallel shiftable by way of a translation ratio setting device with one or several threaded spindles (18) and wherein the frame is fixable in the preselected position.

9. The gear transmission with a steplessly adjustable translation ratio according to claim 8, wherein the second lever system with second lever rails (10a) is rotatably supported in second bearing supports (16a) guided through the frame (17).

10. The gear transmission with steplessly adjustable translation ratio according to claim 1, wherein the cam member (20, 20a, 20b) of the first force transmission means (1) drives several gear transmission units (I, II).

11. The gear transmission with a steplessly adjustable translation ratio according to claim 1, wherein the first force transmission means (27, 28, 29, 30, 31), the second force transmission means (34, 35, 36), the third force transmission means, the fourth force transmission means, the first changeable translation device (32, 33) and the second changeable translation device are furnished in each case as pairs in each gear transmission unit for mass balancing and for bearing force balancing.

12. The gear transmission with a steplessly adjustable translation ratio according to claim 1, wherein the cam gear transmission contained in the second force transmission means exhibits a cam cylinder (38) as a spatial cam member and a slider as an engagement member (40).

13. The gear transmission with a steplessly adjustable translation ratio according to claim 12, wherein the second force transmission means includes a spatial cam gear transmission, wherein the cam member is furnished like a threading with an open groove curve (39) with a constant slope, wherein the groove curve describes several rotations.

14. The gear transmission with a steplessly adjustable translation ratio according to claim 13, wherein the engagement member (40) exhibits several cam rollers (42).

15. A gear transmission with the steplessly adjustable translation ratio, wherein the rotary motion of a drive shaft (4) is intermittently transferred for in each case a time period designated as force transmission phase to a driven shaft (37) by at least two time staggered operating gear transmission units (I, II), wherein each gear transmission unit comprises a first force transmission means (1), a changeable translation ratio device and a second force transmission means (14) as well as an automatic switching or switchable coupling (51) and wherein the first force transmission means (1) converts the uniform rotary motion of the drive shaft (4) into a uniform translation motion in the force transmission phase under the precondition of a just constant maintained translation ratio setting, wherein the translation device converts this motion into another, also uniform translation motion with a speed depending on the translation ratio setting and wherein the second force transmission means (14) transforms this translational motion into a uniform rotary motion, wherein the uniform rotary motion is transferred to the driven shaft (37) through the coupling, wherein the second force transmission means (14) includes a cam gear transmission (11, 12, 13, 49, 50).

16. The gear transmission with a steplessly adjustable translation ratio according to claim 15, wherein the cam gear transmission, which is contained in the second force transmission means (14), is a planar cam gear transmission and comprises a planar cam member (13), which drives the driven shaft (37) through the coupling (51) and wherein the curve flanks of the cam member (13) are formed as an involute (A2B2) of a circle in the load region, and wherein the cam gear transmission is furnished with a straight line guided engagement member (11).

17. The gear transmission with a steplessly adjustable translation ratio according to claim 15, wherein the first force transmission means (1) includes a planar cam gear transmission, wherein the planar cam gear transmission includes a planar cam member (2), wherein the planar cam member (2) is driven by the drive shaft (4) and wherein the curve flank (3) of the cam member (2) is formed in the load region as an involute (AB) of a circle, and wherein the planar cam transmission is furnished with a straight line guided engagement member (5).

18. The gear transmission with a steplessly adjustable translation ratio according to claim 15, wherein the translation device comprises a rotatably supported lever system with lever rails (10), wherein a stroke element of each of the two force transmission means (1,14) engages the lever rails (10), wherein the stroke elements are guided in straight line motion tracks (C—C, D—D) disposed parallel to each other and wherein the position of the hinge point (E) of the lever system is such adjustable, that the ratio of the distances between the hinge point and the motion tracks can be steplessly changed.

19. The gear transmission with a steplessly adjustable translation ratio according to claim 18, wherein the lever system is rotatably supported in bearing supports (16) guided through a frame (17), wherein the frame is parallel shiftable with a translation ratio setting device with one or several threaded spindles (18) and wherein the frame is fixable in any preselected position.

20. The gear transmission with steplessly adjustable translation ratio according to claim 15, wherein the cam member (20, 20a, 20b) of the first force transmission means (1) drives several gear transmission units (I, II).

21. The gear transmission with a steplessly adjustable translation ratio according to claim 15, wherein the force transmission means (27, 28, 29, 30, 31 and 34, 35, 36) and the translation device (32, 33) are furnished in each case as pairs in each gear transmission unit for mass balancing and for bearing force balancing.

22. The gear transmission with a steplessly adjustable translation ratio according to claim 15, wherein the cam gear transmission contained in the second force transmission means (14) exhibits a cam cylinder as a spatial cam member (38) and a slider as an engagement member (40);

wherein the second force transmission means (14) includes a spatial cam gear transmission, wherein the cam member (38) is furnished like a threading with an open groove curve (39) or with several open groove curves (39) with a constant slope, wherein the groove curves describe several rotations; wherein the engagement member (40) exhibits several cam rollers (42).

* * * * *